(12) United States Patent
Fischbein et al.

(10) Patent No.: US 10,927,574 B2
(45) Date of Patent: Feb. 23, 2021

(54) MOTOR VEHICLE

(71) Applicant: Ford Global Technologies, LLC, Dearborn, MI (US)

(72) Inventors: Igor Fischbein, Cologne (DE); James Neugebauer, Chelmsford (GB); Torsten Gerhardt, London (GB); Bruce Southey, Farnham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 16/002,400

(22) Filed: Jun. 7, 2018

(65) Prior Publication Data
US 2018/0371809 A1  Dec. 27, 2018

(30) Foreign Application Priority Data

Jun. 27, 2017 (DE) .................. 102017210829.0

(51) Int. Cl.
| | |
|---|---|
| *E05C 17/04* | (2006.01) |
| *E05B 83/20* | (2014.01) |
| *B60J 5/10* | (2006.01) |
| *E05C 17/30* | (2006.01) |
| *B60R 5/04* | (2006.01) |
| *B62D 25/12* | (2006.01) |

(52) U.S. Cl.
CPC .............. *E05C 17/042* (2013.01); *B60J 5/107* (2013.01); *E05B 83/20* (2013.01); *E05C 17/30* (2013.01)

(58) Field of Classification Search
CPC ........ E05C 17/042; E05C 17/30; E05B 83/20; B60J 5/107; B60R 5/041; B62D 25/12

USPC ..... 49/366; 296/1.01, 37.13, 68, 139, 146.1, 296/146.4, 202
See application file for complete search history.

(56) References Cited

U.S. PATENT DOCUMENTS

| | | | |
|---|---|---|---|
| 2,684,265 A | 7/1954 | Ceresa | |
| 5,165,742 A | 11/1992 | Frayne | |
| 2008/0238122 A1 | 10/2008 | Leopold et al. | |
| 2016/0311383 A1* | 10/2016 | Lange .................... | E05B 81/90 |

(Continued)

FOREIGN PATENT DOCUMENTS

| | | |
|---|---|---|
| DE | 7726441 U1 | 3/1978 |
| DE | 3025145 A1 | 3/1982 |
| DE | 8303056 U1 | 7/1983 |

(Continued)

*Primary Examiner* — Justin V Lewis
(74) *Attorney, Agent, or Firm* — David Coppiellie; Price Heneveld LLP

(57) ABSTRACT

A motor vehicle has a tailgate arranged pivotably on a body. The tailgate in a closed position closes a cargo space opening of the body at the rear and in an open position at least partially exposes the cargo space opening. A tailgate latch locks the closed position of the tailgate and has a closing element and a locking mechanism interacting with the closing element in the closed position. In order to make available a variable cargo space size, in which an open position of the tailgate can be secured, a support arm is pivotably articulated with one end between a rest position, in which the support arm is immovably secured, and a functional position, in which the support arm pivots in the direction of the locking mechanism, and is capable of being fixed with another end to the locking mechanism by an actuation of the locking mechanism.

17 Claims, 7 Drawing Sheets

(56) References Cited

U.S. PATENT DOCUMENTS

2017/0306667 A1\* 10/2017 Mitchell ................. E05C 17/30

FOREIGN PATENT DOCUMENTS

| DE | 29806802 U1 | 6/1998 | |
|---|---|---|---|
| DE | 102005041217 A1 | 3/2007 | |
| EP | 0556472 A2 | 12/1992 | |
| FR | 2845053 A1 | 4/2004 | |
| WO | 2014037469 A1 | 3/2014 | |
| WO | WO-2016082022 A1 \* | 6/2016 | ........... E05C 17/042 |

\* cited by examiner

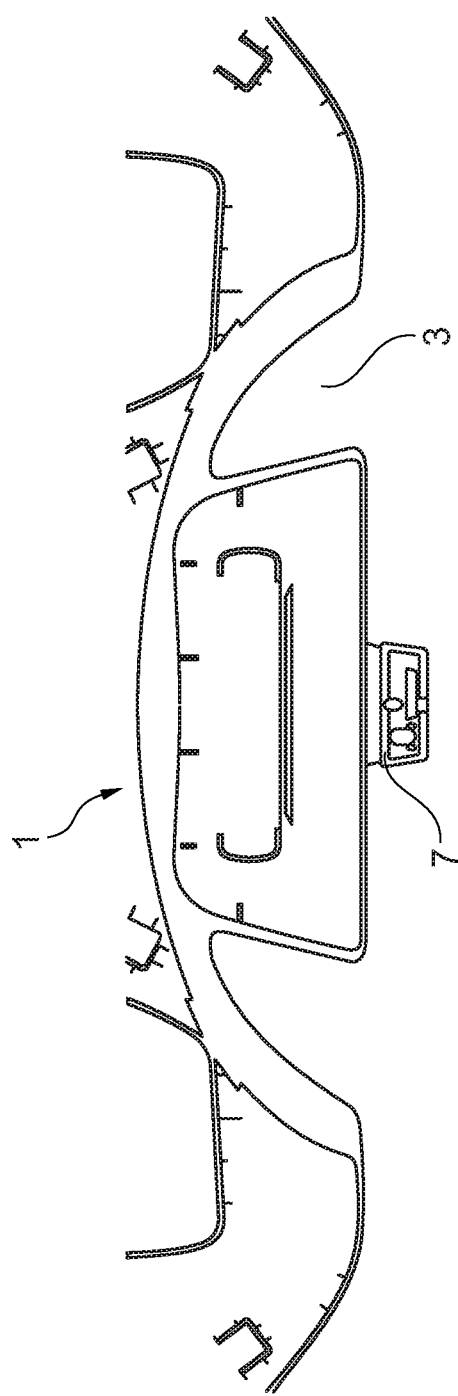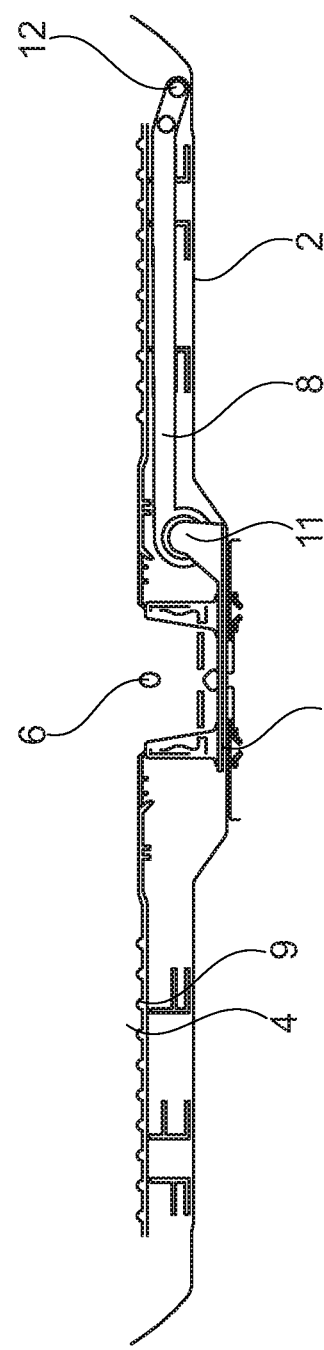
Fig. 2

MOTOR VEHICLE

FIELD OF THE INVENTION

The present invention generally relates to vehicles, and more particularly relates to a motor vehicle having a tailgate arranged pivotably on a body of the motor vehicle and a tailgate latch for locking the closed position of the tailgate.

BACKGROUND OF THE INVENTION

Motor vehicles configured with a hatchback generally exhibit at the rear a cargo space, which is closable with a tailgate. Particularly in small vehicles, the available cargo space is a relatively small configuration. The tailgate usually cannot be closed completely if a larger object, which cannot be disposed completely inside the available cargo space, is transported by such vehicle. The tailgate must then either remain in its open position or be secured in an intermediate position with a strap or the like during a journey.

FR 2845053 A1 discloses the use of a lower tailgate element of a horizontally divided tailgate situated in the open position as a cargo space floor extension and the arrangement of a peripheral side wall on the lower tailgate element, in order to provide lateral support for an object positioned or placed on the lower tailgate element. EP 0556472 A2 and DE 3025145 A1 each propose a motor vehicle, in which the rear area is variable for the transport of larger items.

U.S. Patent Application Publication No. 2008/0238122 A1 discloses a tailgate arrangement of a motor vehicle, in particular a passenger vehicle, having a cargo space extension element mounted on a tailgate in the interior of the vehicle, enclosing a cavity. The cargo space extension element is or can be connected in a gas-tight and water-tight manner to a cargo space of the motor vehicle in order to extend the space and is capable of being braced between the tailgate and a rear carrier mounted on the motor vehicle tailgate.

DE 102005041217 A1 relates to a rear door of an automobile, which is divided horizontally into two part-leaves, wherein for the purpose of opening the rear door an upper leaf is arranged pivotably upwards, and a lower leaf is arranged to be folded initially into a horizontal position and to be retracted by sliding into the area beneath a loading floor. The lower leaf is lockable in the horizontal position as an extension of the loading floor.

WO 2014/037469 A1 discloses a divided tailgate for a motor vehicle, having a first motor vehicle door, which is pivotable between a closed position and an open position, a second motor vehicle door, which is pivotable between a closed position and an open position; first and second driving means for the displacement of the motor vehicle doors respectively between the respective closed and open positions; and control means for controlling the driving means, in order to control the movement of the motor vehicle doors between the open and the closed positions. The control device is provided with position information, which relates to each of the motor vehicle doors, and the control device is configured to ensure that the motor vehicle doors do not attempt to occupy the same space at the same time. The motor vehicle doors can be configured such that they partially overlap one another in the closed position.

It would be desirable to make available a motor vehicle having a variable cargo space size, in which an open position of a tailgate can be secured.

SUMMARY OF THE INVENTION

According to one aspect of the present invention, a motor vehicle is provided. The motor vehicle includes a body, and a tailgate arranged pivotably on the body. The tailgate in a closed position closes a cargo space opening at a rear of the body and in an open position at least partially exposes the cargo space opening. The motor vehicle also includes a tailgate latch for locking the closed position of the tailgate, wherein the tailgate latch has a closing element and a locking mechanism interacting with the closing element in the closed position of the tailgate. The motor vehicle further includes a support arm pivotably articulated a first one end between a rest position, in which the support arm is immovably secured, and a functional position, in which the support arm pivots in a direction of the locking mechanism, and is capable of being fixed with a second end to the locking mechanism by an actuation of the locking mechanism, on a structural component of the motor vehicle on which the closing element is arranged.

According to another aspect of the present invention, a vehicle is provided. The vehicle includes a body, a rear closure arranged pivotably on the body and movable between open and closed positions, a latch having a closing element interacting with a locking mechanism in the closed position of the rear closure, and a support arm configured to pivotably articulate between a rest position and an outward functional position fixed to the locking mechanism.

According to a further aspect of the present invention, a motor vehicle is provided. The motor vehicle includes a body, and a tailgate arranged pivotably on the body, wherein the tailgate in a closed position closes a cargo space opening of the body at the rear and in an open position at least partially exposes the cargo space opening. The motor vehicle also includes a tailgate latch for locking the closed position of the tailgate, wherein the tailgate latch has a closing element and a locking mechanism interacting with the closing element in the closed position of the tailgate, wherein the closing element or the locking mechanism is arranged movably between a first functional position, in which locking of the closed position of the tailgate can take place, and a second functional position, in which the closing element or the locking mechanism is displaced with the tailgate in the open position in the direction of the locking mechanism or of the closing element. The motor vehicle further includes an adjustment mechanism connecting the closing element or the locking mechanism to a structural component of the motor vehicle, which is adapted to displace the closing element or the locking mechanism in the direction of the first functional position and/or to subject it to a force in the direction of the first functional position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a schematic, sectioned representation of the motor vehicle depicted in FIG. 1 with the tailgate in an open position;

DETAILED DESCRIPTION OF THE PREFERRED EMBODIMENTS

In the various figures, identical components are always provided with the same reference designations, for which reason these are described only once as a general rule.

Figure 1:
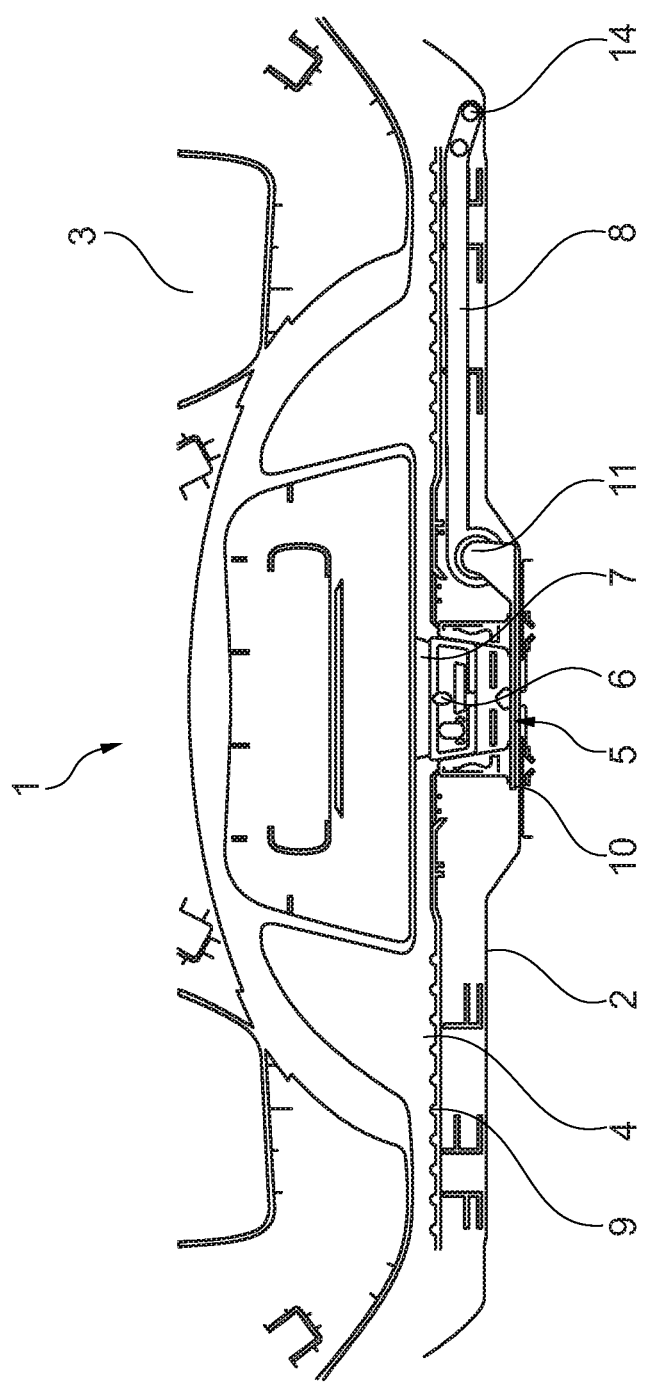
FIG. 1 is a schematic, sectioned representation of an illustrative embodiment of a motor vehicle with the tailgate in the closed position.

FIG. 1 depicts a schematic, sectioned representation of an illustrative embodiment of an inventive motor vehicle 1 having a rear closure shown as a tailgate 3 pivotably arranged on a body 2 of the motor vehicle 1, which tailgate in the depicted closed position closes a cargo space opening 4 of the body 2 at the rear, and at least partially exposes the cargo space opening 4 in an open position depicted in FIGS. 2-5. Furthermore, the motor vehicle 1 has a tailgate latch 5 for locking the closed position of the tailgate 3. The tailgate latch 5 has a bolt-shaped closing element 6 and a locking mechanism, not depicted here, interacting with the closing element 6 in the closed position of the tailgate 3, which locking mechanism is arranged in a housing 7. The closing element 6 is arranged on the body 2, and the locking mechanism is arranged on the tailgate 3.

Figure 4:
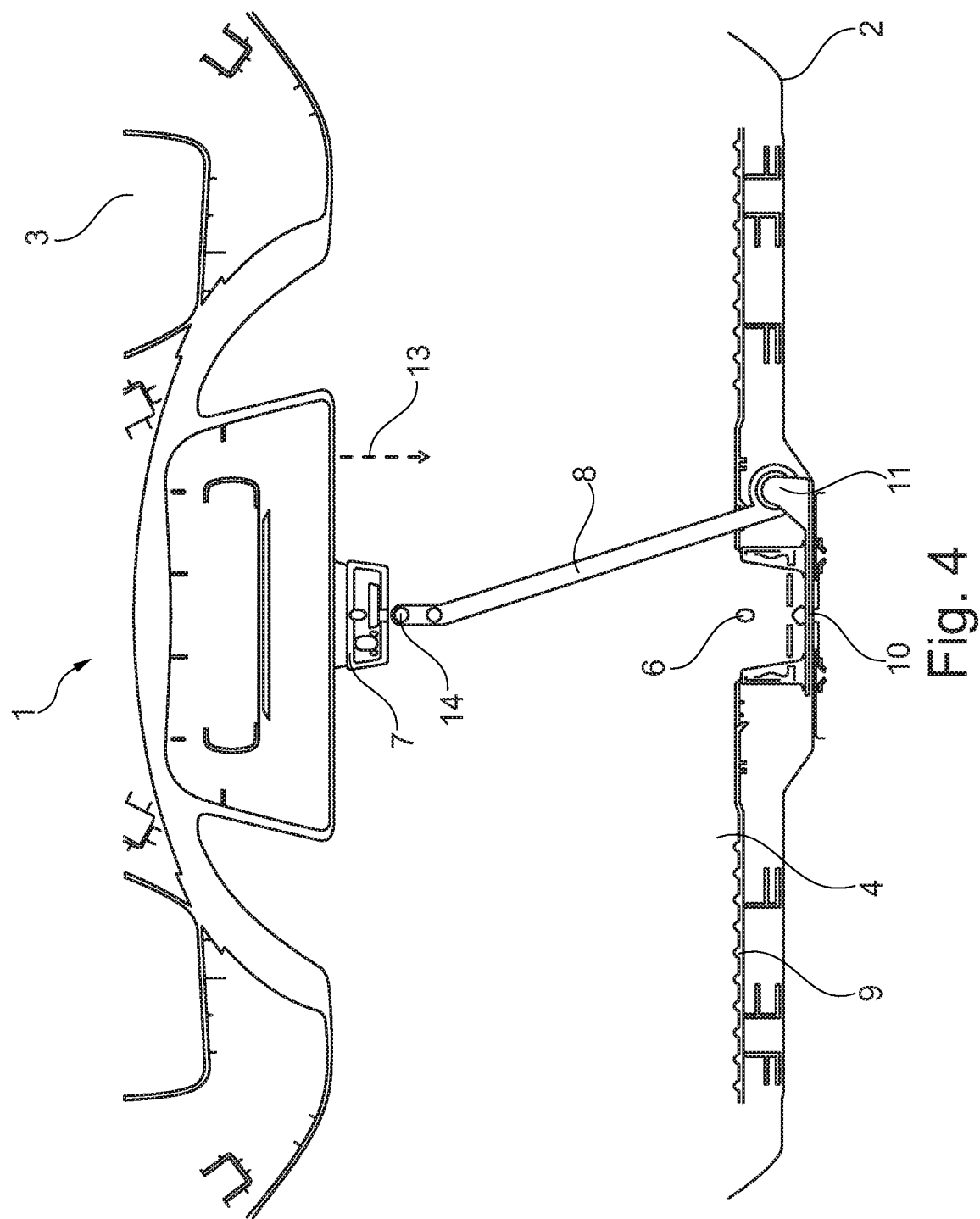
FIG. 4 is a schematic, sectioned representation of the motor vehicle depicted in FIG. 2 with the support arm in the functional position.
Figure 5:
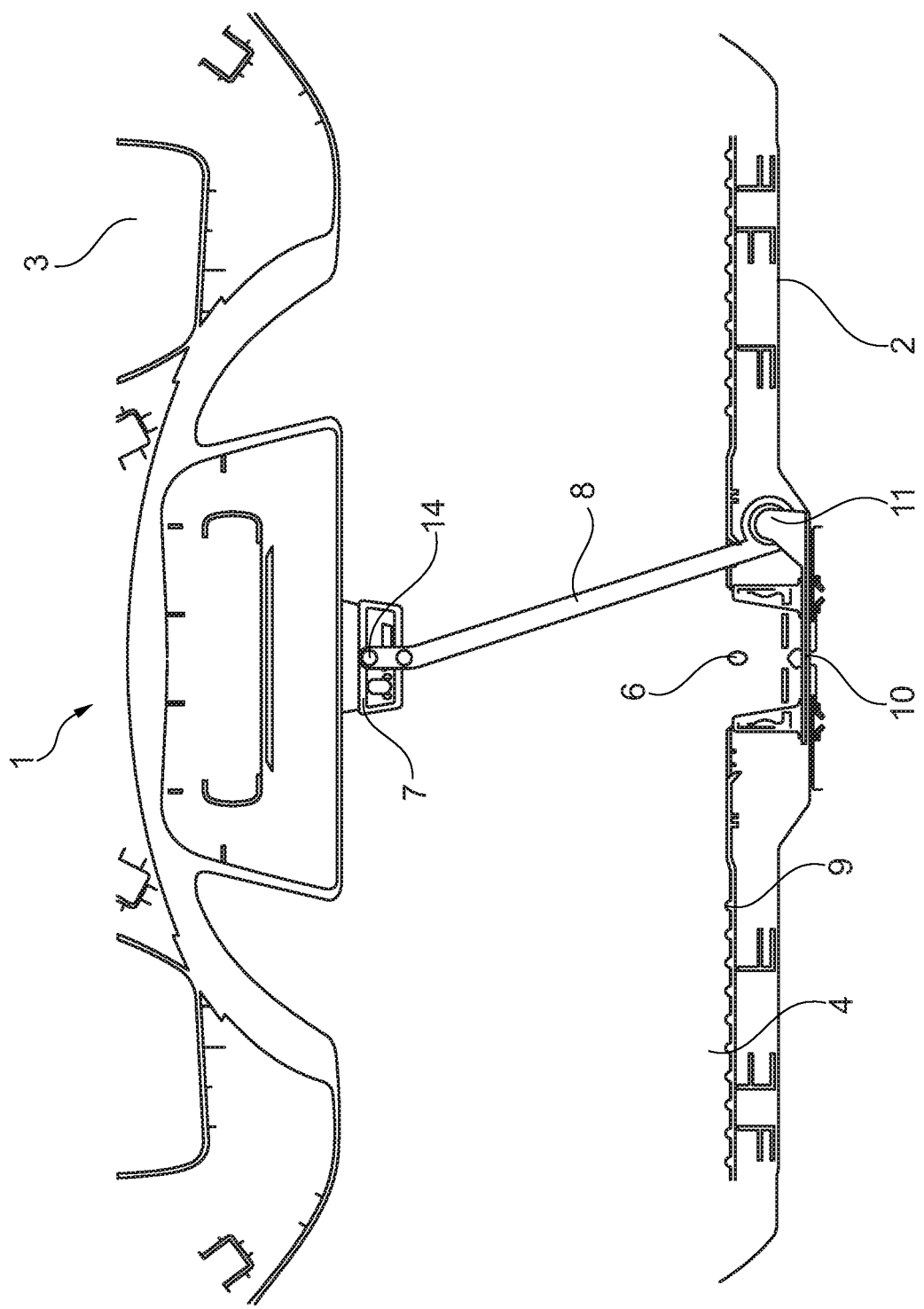
FIG. 5 is a schematic, sectioned representation of the motor vehicle depicted in FIG. 4 with the support arm fixed to the tailgate.

A support arm 8 is pivotably articulated on the body 2 with one end between the depicted rest position, in which the support arm 8 is immovably secured to the body 2, and a functional position depicted in FIGS. 4 and 5, in which the support arm 8 pivots in the direction of the locking mechanism and is capable of being fixed to the locking mechanism with another end by an actuation of the locking mechanism. Arranged on the body 2 is an interior trim 9, on which there is arranged a receiver, not depicted here in more detail, for the at least partial receiving of the support arm 8 in its rest position. The support arm 8 is linked flexibly to a bearing plate 10, which is fixed to the body 2. At least one bearing limb 11, linked flexibly to the support arm 8, is arranged on the bearing plate 10. An elastic bearing element, not depicted here, for example a bearing sleeve, can be arranged between the support arm 8 and the bearing limb 11, in order to improve the mobility of the support arm 8 in relation to the bearing limb 11 and to be able to transfer any occurring vibrations of the tailgate 3 and/or of the body 2 in a damped manner via the support arm 8 onto the body 2 or the tailgate 3. Arranged at the other end of the support arm 8 is at least one closing element 14, which can be configured correspondingly to the closing element 6. As an alternative, the support arm 8 can have at least two arm sections, not depicted here, that are linked flexibly to each other in order to be able to vary the functional length of the support arm 8.

The motor vehicle 1 can in addition have a mechanism with which a length of the support arm 8 fixed on the locking mechanism or a point of articulation of the support arm 8 fixed on the locking mechanism is capable of displacement. Furthermore, the motor vehicle 1 can have at least one lateral cover with which a free space formed between the cargo space opening 4 and the tailgate 3 in the open position is capable of being covered laterally.

As an alternative, the tailgate 3 can have a lower tailgate element connected to the body 2 via at least one articulation on a side of the tailgate 3 that is close to the ground, and an upper tailgate element connected to the body 2 via at least one articulation on a side of the tailgate 3 that is remote from the ground, wherein the support arm 8 can be pivotably articulated on the upper tailgate element or on the lower tailgate element, and the locking mechanism can be arranged on the lower tailgate element or on the upper tailgate element. In this case, the motor vehicle 1 can have at least one further support arm articulated pivotably laterally on the body 2 or on the lower tailgate element, and at least one closing unit arranged on the lower tailgate element or on the body 2, wherein the further support arm can be pivotably articulated between a rest position, in which the further support arm is immovably secured to the body 2 or the lower tailgate element, and a functional position, in which the further support arm pivots in the direction of the closing unit and is capable of being fixed to the closing unit with another end by an actuation of the closing unit.

FIG. 2 depicts a schematic, sectioned representation of the motor vehicle 1 depicted in FIG. 1 having a tailgate 3 in an open position. The support arm 8 is in the rest position, furthermore.

Figure 3:
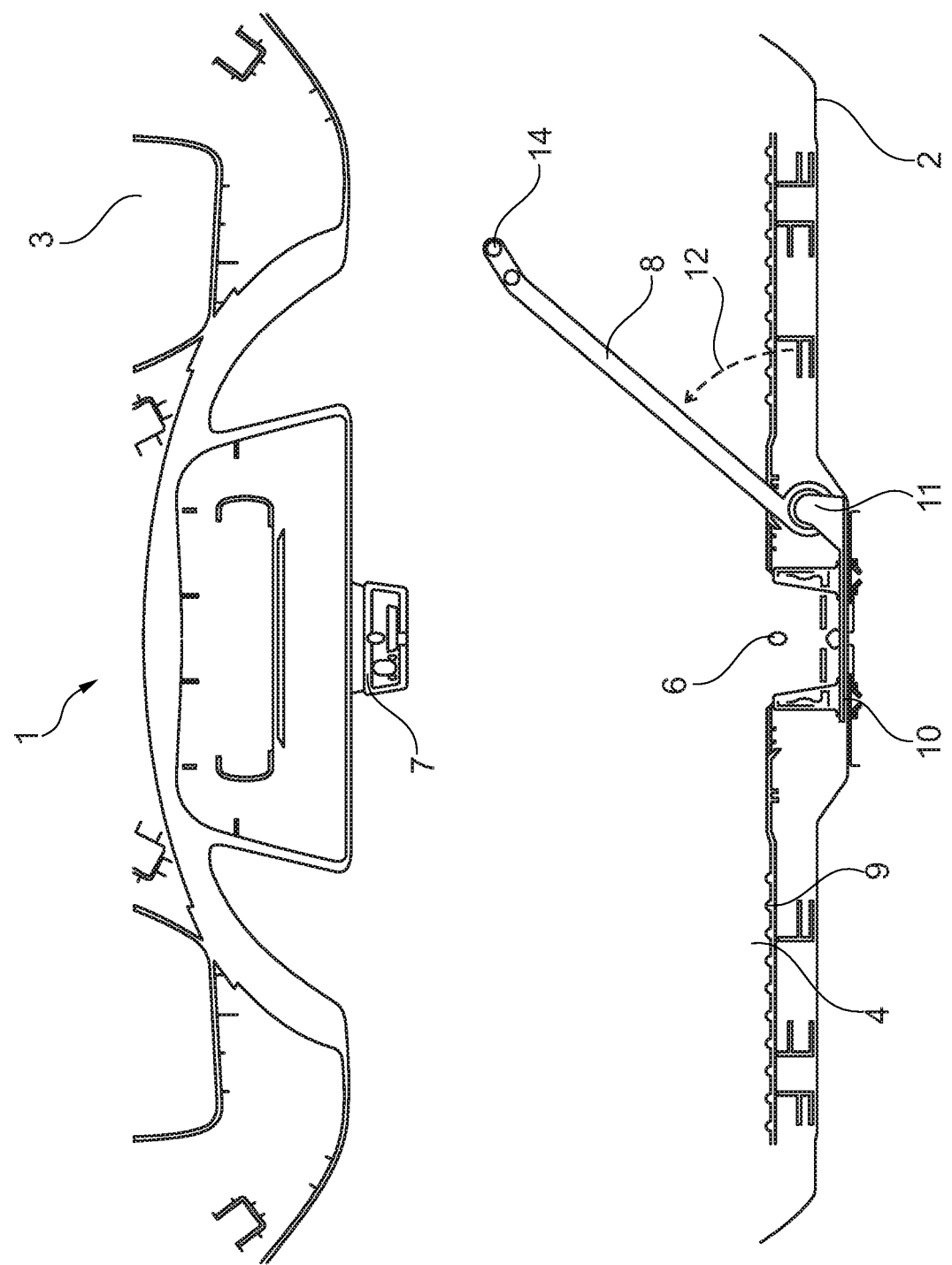
FIG. 3 is a schematic, sectioned representation of the motor vehicle depicted in FIG. 2 with a pivoted support arm.

FIG. 3 depicts a schematic, sectioned representation of the motor vehicle 1 depicted in FIG. 2 having a pivoted support arm 8. The support arm 8 has been pivoted from its rest position in the direction of the arrow 12 for this purpose.

FIG. 4 depicts a schematic, sectioned representation of the motor vehicle 1 depicted in FIG. 2 having a support arm 8 in the functional position. The other end of the support arm 8 is arranged in this case in the vicinity of the locking mechanism and can be brought into engagement with the locking mechanism by a movement of the tailgate 3 corresponding to the arrow 13, as depicted in FIG. 4.

FIG. 5 depicts a schematic, sectioned representation of the motor vehicle 1 depicted in FIG. 4 having a support arm 8 fixed on the tailgate 3. For this purpose, the locking mechanism has been actuated in order to secure the other end of the support arm 8 on the locking mechanism.

Figure 6:
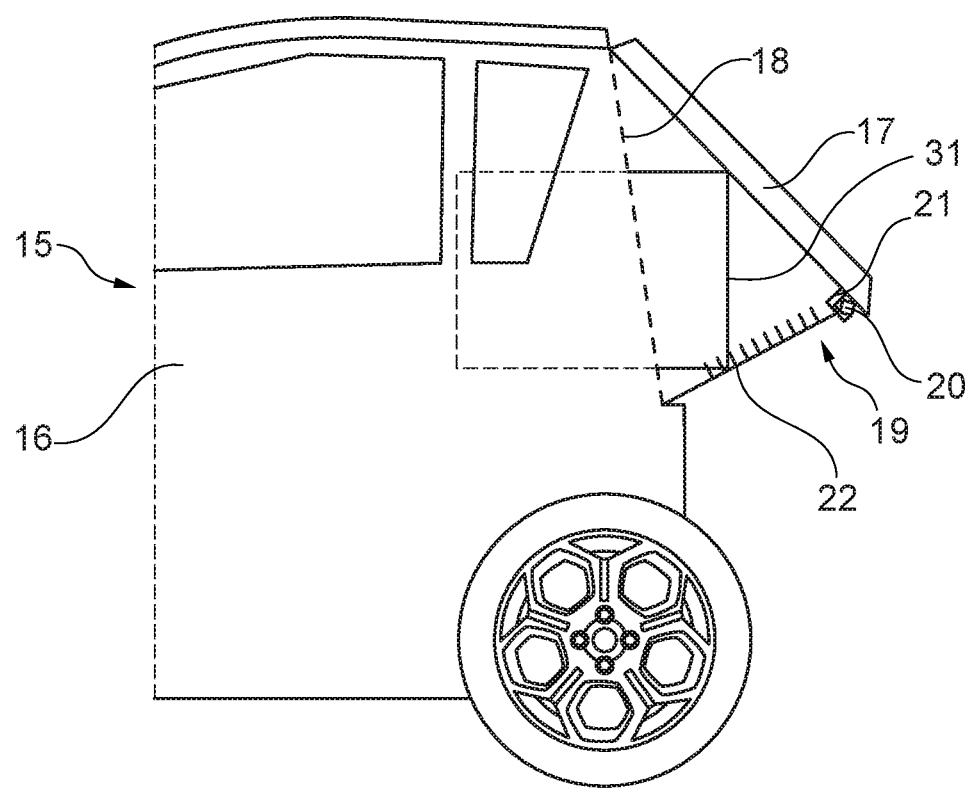
FIG. 6 is a schematic side view of a further illustrative embodiment of the motor vehicle.

FIG. 6 depicts a schematic side view of a further illustrative embodiment of a motor vehicle 15. The motor vehicle 15 has a tailgate 17 arranged pivotably on a body 16 of the motor vehicle 15, which, in a closed position closes an opening 18 of the body 16 at the rear cargo space, and, in the depicted open position, at least partially exposes the cargo space opening 18. In addition, the motor vehicle 15 has a tailgate latch 19 for locking the closed position of the tailgate 17. The tailgate latch 19 has a closing element 20 arranged on the tailgate 17 and a locking mechanism 21 interacting with the closing element 20 in the closed position of the tailgate 17.

The closing element 20 is movably arranged between a first functional position in which locking of the closed position of the tailgate 17 can take place, and the depicted second functional position, in which the closing element 20 is displaced in the direction of the locking mechanism 21 with the tailgate 17 in the open position. The closing element 20 is connected to the body 16 via an adjustment mechanism 22, which is adapted to displace the closing element 20 in the direction of the first functional position and/or to subject it to a force in the direction of the first functional position. The tailgate 17 is thereby pressed against an object 31 protruding from the cargo space opening 18.

The motor vehicle 15 can have at least one lateral cover with which a free space formed between the cargo space opening 18 and the tailgate 17 in the open position is capable of being covered laterally.

Figure 7:
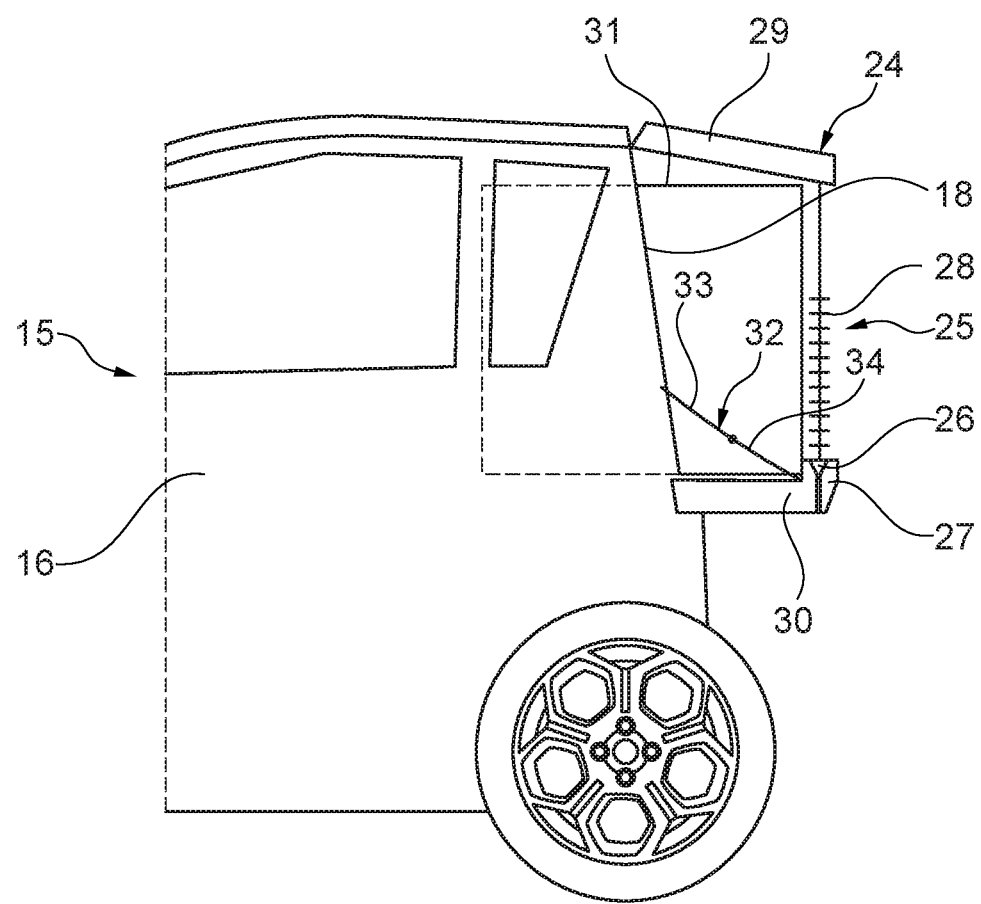
FIG. 7 is a schematic side view of a further illustrative embodiment of the motor vehicle.

FIG. 7 depicts a schematic side view of a further illustrative embodiment of a motor vehicle 23. The motor vehicle 23 has a tailgate 24 arranged pivotably on a body 16 of the motor vehicle 23, which tailgate in a closed position closes a cargo space opening 18 of the body 16 at the rear and exposes the cargo space opening 18 at least partially in the depicted open position. Furthermore, the motor vehicle 23 has a tailgate latch 25 for locking the closed position of the tailgate 24. The tailgate latch 25 has a closing element 26 and a locking mechanism 27 interacting with the closing element 26 in the closed position of the tailgate 24.

The closing element 26 is movably arranged between a first functional position in which locking of the closed position of the tailgate 24 can take place, and the depicted second functional position, in which the closing element 26 is displaced in the direction of the locking mechanism 27 with the tailgate 24 in the open position. The closing element 26 is connected via an adjustment mechanism 28 to an upper tailgate element 29 of the tailgate 24, which is adapted to displace the closing element 26 in the direction of the first functional position and/or to subject it to a force in the direction of the first functional position.

The tailgate 24 has a lower tailgate element 30 connected to the body 16 on a side of the tailgate 24 that is close to the ground via at least one articulation and the upper tailgate element 29 connected to the body 16 on a side of the tailgate 24 that is remote from the ground via at least one articulation. The closing element 26 is arranged on the upper tailgate element 29, and the locking mechanism 27 is arranged on the lower tailgate element 30. The upper tailgate element 29 is pressed from above against an object 31 protruding from the cargo space opening 18.

The motor vehicle 23 comprises at least one support arm 32 articulated pivotably laterally on the body 16 and on the lower tailgate element 30 having at least two arm sections 33 and 34 that are linked flexibly to each other, wherein the support arm 32 is movably arranged between a retracted rest position in which the arm sections 33 and 34 are arranged adjacent to one another, and an extended functional position depicted in FIG. 7, in which the arm sections 33 and 34 are arranged in alignment with one another. The extended functional position of the support arm 32 can be locked, in order to prevent the support arm 32 from moving of its own accord into the retracted rest position. The locking of the functional position can be released manually.

As an alternative, the motor vehicle 23 can have at least one support arm articulated pivotably, laterally on the body 16 or on the lower tailgate element 30, and at least one closing unit arranged on the lower tailgate element 30 or on the body 16, wherein the support arm is pivotably articulated between a rest position, in which the support arm is immovably secured to the body 16 or the lower tailgate element 30, and a functional position, in which the support arm pivots in the direction of the closing unit, and is capable of being fixed with another end to the closing unit by an actuation of the closing unit.

As an alternative, the motor vehicle 23 can have at least one telescopic support arm articulated pivotably, laterally on the body 16 and on the lower tailgate element 30 wherein the support arm is adjustable in length between a retracted rest position and an extended functional position, in which the length of the support arm is greater than in the retracted rest position. The extended functional position of the support arm can be locked, in order to prevent the support arm from moving of its own accord into a retracted rest position. The locking of the functional position can be released manually.

The motor vehicle 23 can have at least one lateral cover with which a space formed between the cargo space opening 18 and the tailgate 24 in the open position is capable of being covered laterally.

According to one embodiment of the present disclosure, a motor vehicle has at least one support arm that is pivotably articulated with one end between a rest position, in which the support arm is immovably secured to the structural component, and a functional position, in which the support arm pivots in the direction of the locking mechanism, and is capable of being fixed with another end to the locking mechanism by an actuation of the locking mechanism, on that structural component of the motor vehicle on which the closing element is arranged.

It should be pointed out that the characterizing features and measures that are individually mentioned in the following description can be combined with one another in any desired technically expedient manner and demonstrate further embodiments of the disclosure. The description characterizes and specifies the embodiments additionally, in particular in the context of the figures.

According to one embodiment, the open position of the tailgate can be secured by the pivotable support arm, if the other end pivots in the direction of the locking mechanism and is fixed to the locking mechanism by an actuation of the locking mechanism. The tailgate is thereby connected to the body via the support arm and is supported on the body via the support arm. The support arm is attached with one end to the structural component of the motor vehicle, so that the support arm is not a separate structural component. This simplifies the operation of the vehicle and tailgate, since the support arm in its functional position need only be connected to the locking mechanism. The support arm can be articulated on an extension of a closing plate, for example, to which the closing element is also fixed.

In a variant of the disclosure, the support arm and the closing element are arranged on the tailgate, whereas the locking mechanism is fixed to the body. In a further variant of the disclosure, the support arm and the closing element are arranged on the body, whereas the locking mechanism is fixed to the tailgate. The closing element can be a closing pin, a closing shackle or a closing hook, for example. The locking mechanism can have a rotary latch and a locking pawl, for example.

In the rest position, the support arm is arranged on the structural component in such a way that it does not protrude, or it protrudes only insignificantly, from the structural component, so that the operation of the motor vehicle or of the tailgate is not compromised. In order that the support arm does not move away from the rest position of its own accord, the support arm is immovably secured to the structural component in the rest position. At least one mechanical retaining element can be arranged on the structural component for this purpose, which engages on the support arm in the rest position of the support arm. The retaining element can be a retaining strap, for example a hook-and-loop tape, or can have at least one clamping element or latching element. The retaining element can be configured by a section of an interior trim of the tailgate or of the cargo space at the rear.

For the purpose of transferring the support arm from the rest position into the functional position, the support arm is pivoted manually in the direction of the locking mechanism until the other end of the support arm is present in the vicinity of the locking mechanism. Any distance between the other end of the support arm and the locking mechanism can then be reduced by pivoting the tailgate in the direction of its closed position, so that the other end of the support arm is arranged on the locking mechanism, and the other end of the support arm is fixed on the locking mechanism by an actuation of the locking mechanism. In order to interrupt the supporting of the tailgate on the body via the support arm, the locking mechanism is actuated initially in order to release the other end of the support arm. The tailgate can then be pivoted in the direction of its open position, in order to increase the distance between the other end of the support arm and the locking mechanism. The support arm can then be pivoted manually from its functional position into its rest position.

The motor vehicle can have two or more support arms of different length, which can be connected optionally to the locking mechanism. Various open positions of the tailgate can be secured thereby. The motor vehicle can have a hatchback or liftback, for example. The motor vehicle can be a passenger vehicle or a goods transportation vehicle, for example.

According to an advantageous embodiment, the support arm has at least two arm sections that are linked flexibly to each other. The functional length of the support arm can be varied in this way by connecting the arm section, with which the respective open position of the tailgate optimal can be secured, to the locking mechanism. Various open positions of the tailgate can be secured in this way with a single support arm having a multi-section configuration.

A further advantageous embodiment proposes that at least one receiver for receiving the support arm at least partially in its rest position is arranged on the structural component. The receiver can be configured in such a way that the support arm in its rest position is arranged partially or completely recessed in the receiver. As a result, the support arm in its rest position protrudes non-intrusively from the structural component.

According to a further advantageous embodiment, the tailgate has a lower tailgate element connected to the body via at least one articulation on a side of the tailgate that is close to the ground and an upper tailgate element connected to the body via at least one articulation on a side of the tailgate that is remote from the ground, wherein the support arm is pivotably articulated on the upper tailgate element or the lower tailgate element, and the locking mechanism is arranged on the lower tailgate element or on the upper tailgate element. The support arm is thus arranged accordingly either on the upper tailgate element and the locking mechanism on the lower tailgate element or the support arm on the lower tailgate element and the locking mechanism on the upper tailgate element. The tailgate is divided horizontally hereby. In the closed position of the tailgate, both tailgate elements are in their respective closed position. An actuation of the locking mechanism with the tailgate closed can cause the locking mechanism to engage on the closing element in order to lock the closed position of the tailgate. In an open position of the tailgate, either the upper tailgate element alone or the lower tailgate element alone can be in an open position, or both tailgate elements can each be in an open position. Each of these open positions can be secured by the support arm.

The motor vehicle advantageously has at least one further support arm articulated pivotably laterally on the body or on the lower tailgate element and at least one closing unit articulated on the lower tailgate element or the body, wherein the further support arm is pivotably articulated between a rest position, in which the further support arm is immovably secured to the body or the lower tailgate element, and a functional position, in which the further support arm pivots in the direction of the closing unit and is capable of being fixed to the closing unit with another end by an actuation of the closing unit. This embodiment is well suited, for example, if the closing element and the locking mechanism are arranged approximately centrally on the respective tailgate element. The lower tailgate element in its closed position can be secured to the body conventionally on one side or both sides in each case via a latch with a locking mechanism and a closing element. If an open position of the upper tailgate elements is to be secured to the lower tailgate element via the support arm, it may be necessary as a result to secure the open position of the lower tailgate element. The further support arm is used for this purpose, which, with the lower tailgate element in its open position, is secured to the closing unit, which can have an operable locking mechanism. The lower tailgate element can be supported in its open position on both sides in each case appropriately via a support arm. The further support arm can have at least two arm sections that are linked flexibly to each other. The further support arm in its rest position can be partially or completely received in a receiver on the body or on the lower tailgate element.

According to a further advantageous embodiment, the motor vehicle has at least one mechanism with which, on the one hand, a length of the support arm fixed to the locking mechanism and/or of the further support arm fixed to the closing unit is variable or, on the other hand, a point of articulation of the support arm fixed to the locking mechanism and/or of the further support arm fixed to the closing unit is capable of displacement. An actuation of the mechanism can cause the tailgate in its entirety or at least one tailgate element thereof to be subjected via the support arm to a force in the direction of the respective closed position, so that the tailgate or the tailgate element can be brought into contact with an item being transported protruding from the cargo space at the rear. The item being transported can be secured thereby at the rear. The mechanism can have a latching mechanism, for example.

Furthermore, the above tailgate latching is accomplished by a motor vehicle wherein the closing element and/or the locking mechanism is movably arranged between a first functional position, in which locking of the closed position of the tailgate can take place, and a second functional position, in which the closing element or the locking mechanism is displaced with the tailgate in the open position in the direction of the locking mechanism or of the closing element, wherein the closing element or the locking mechanism is connected via an adjustment mechanism to the respective structural component of the motor vehicle, which is adapted to displace the closing element or the locking mechanism in the direction of the first functional position and/or to subject it to a force in the direction of the first functional position.

According to one embodiment, the open position of the tailgate can be secured, with the tailgate in the open position, by moving the closing element, the locking mechanism or both the closing element and the locking mechanism out of the respective first functional position into the respective second functional position, and by the closing element being connected to the locking mechanism, for which purpose the locking mechanism is actuated. The adjustment mechanism can then be actuated, so that the tailgate in its entirety or at least one tailgate element thereof is subjected to a force in the direction of the respective closed position, with the result that the tailgate or the tailgate element can be brought into contact with an item being transported protruding from the cargo space at the rear. The item being transported can be secured thereby at the rear. The adjustment mechanism can have a latching mechanism, for example. In this embodiment, no separate structural components to be connected to the motor vehicle are required, therefore, for securing the open position of the tailgate. The first functional position corresponds to a conventional arrangement of the closing element or locking mechanism.

The closing element can be a closing pin, a closing shackle or a closing hook, for example. The locking mechanism can have a rotary latch and a locking pawl, for example. The closing element or the locking mechanism can be secured in its first functional position via a mechanical securing device. The closing element can be arranged on the tailgate or a tailgate element thereof, whereas the locking mechanism can be arranged on the body or another tailgate element of the tailgate. As an alternative, the locking mechanism can be arranged on the tailgate or a tailgate element thereof, whereas the closing element can be arranged on the body or on another tailgate element of the tailgate.

The motor vehicle can have a hatchback or a liftback, for example. The motor vehicle can be a passenger vehicle or a goods vehicle, for example.

According to an advantageous embodiment, the tailgate has a lower tailgate element connected to the body via at least one articulation on a side of the tailgate that is close to the ground and an upper tailgate element connected to the body via at least one articulation on a side of the tailgate that is remote from the ground, wherein the closing element is arranged on the upper tailgate element or the lower tailgate element, and the locking mechanism is arranged on the lower tailgate element or the upper tailgate element. The tailgate is divided horizontally hereby. In the closed position of the tailgate, both tailgate elements are in their respective closed position. An actuation of the locking mechanism with the tailgate closed can cause the locking mechanism to engage in the closing element in order to lock the closed position of the tailgate. In an open position of the tailgate, either the upper tailgate element alone or the lower tailgate element alone can be in an open position, or both tailgate elements can each be in an open position. Each of these open positions can be secured according to the present disclosure.

Advantageously, the motor vehicle has at least one support arm articulated pivotally laterally on the body or on the lower tailgate element and at least one closing unit arranged on the lower tailgate element or the body, wherein the support arm is pivotably articulated between a rest position, in which the support arm is immovably secured to the body or the lower tailgate element, and a functional position, in which the support arm pivots in the direction of the closing unit and is capable of being fixed to the closing unit with another end by an actuation of the closing unit. This embodiment finds well suited application, for example, when the closing element and the locking mechanism are arranged approximately centrally on the respective tailgate element. The lower tailgate element in its closed position can be secured conventionally to the body on one side or on both sides, respectively, via a latch with a locking mechanism and a closing element. If an open position of the upper tailgate element is to be secured via the support arm on the lower tailgate element, it may therefore be necessary to secure the open position of the lower tailgate element. The support arm is used for this purpose, with the support arm, when the lower tailgate element is in its open position, being secured on the closing unit, which can have an operable locking mechanism. The lower tailgate element can be supported appropriately in its open position on both sides, respectively, via one support arm. The support arm can have at least two arm sections that are linked flexibly to each other. The support arm can be received partially or completely in its rest position in a receiver on the upper tailgate element or the lower tailgate element.

According to a further advantageous embodiment, the motor vehicle has at least one lateral cover, with which a free space formed between the cargo space opening and the tailgate in the open position is capable of being covered laterally. In this way, substances, gases and/or particles can be prevented from penetrating into the free space and thus into the cargo space adjacent thereto. The cover can be produced from a flexible, air-tight and/or water-tight material. Fixing devices and/or guide devices for applying the cover can be arranged on the motor vehicle.

The vehicle, particularly the motor vehicle as shown and described herein, has a tailgate that forms a rear closure arranged pivotally on the vehicle body. The tailgate is shown herein pivoting between a horizontal and substantially vertical position. However, it should be appreciated that the tailgate may rotate in other directions such as to the sides about a vertical pivot to provide the rear closure. For example, one or two vertical tailgate elements may be configured to swing outward with left and right door elements and the support member may be deployed in a horizontal condition to keep one or both door elements partially open.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
    a body;
    a tailgate arranged pivotably on the body, wherein the tailgate in a closed position closes a cargo space opening at a rear of the body and in an open position at least partially exposes the cargo space opening;
    a tailgate latch for locking the closed position of the tailgate, wherein the tailgate latch has a closing element and a locking mechanism interacting with the closing element in the closed position of the tailgate;
    a support arm pivotably articulated with respect to a first end between a rest position, in which the support arm is immovably secured, and a functional position, in which the support arm pivots in a direction of the locking mechanism, and is capable of being fixed with a second end to the locking mechanism by an actuation of the locking mechanism, on a structural component of the motor vehicle on which the closing element is arranged; and
    at least one receiver for at least partial receiving of the support arm in the rest position arranged on the structural component.

2. The motor vehicle as claimed in claim 1, wherein the support arm has at least two arm sections that are linked flexibly to each other.

3. The motor vehicle as claimed in claim 1, wherein the tailgate has a lower tailgate element connected to the body via at least one articulation element on a lower side of the tailgate and an upper tailgate element connected to the body via at least one articulation element on an upper side of the tailgate, wherein the support arm is pivotably articulated on the upper tailgate element or the lower tailgate element, and the locking mechanism is arranged on the lower tailgate element or the upper tailgate element or the body.

4. The motor vehicle as claimed in claim 3 further comprising a further support arm articulated pivotably laterally on the body or on the lower tailgate element and a closing unit arranged on the lower tailgate element or the body, wherein the further support arm is pivotably articulated between a rest position, in which the further support arm is immovably secured to the body or the lower tailgate element, and a functional position, in which the further support arm pivots in a direction of the closing unit and is capable of being fixed with another end to the closing unit by an actuation of the closing unit.

5. The motor vehicle as claimed in claim 4 further comprising a mechanism for displacing a point of articulation of the support arm fixed to the locking mechanism and/or of the further support arm fixed to the closing unit.

6. The motor vehicle as claimed in claim 4 further comprising a mechanism for varying a length of the support arm fixed to the locking mechanism and/or of the further support arm fixed to the closing unit.

7. A vehicle comprising:
a body;
a rear closure arranged pivotably on the body and movable between open and closed positions;
a latch having a closing element interacting with a locking mechanism in the closed position of the rear closure; and
a support arm configured to pivotably articulate between a rest position and an outward functional position, wherein the support arm is fixed to the locking mechanism when in the outward functional position, wherein the rear closure has first and second elements each connected to the body via at least one articulation element, wherein the first and second elements articulate in opposite directions and engage when closed, wherein the support arm is pivotably articulated on the first element or the second element, and the locking mechanism is arranged on the second element or the first element or the body.

8. The vehicle as claimed in claim 7, wherein the support arm has a first end upon which the support arm pivots and a second end configured to be fixed to the locking element in the functional position, and wherein the support arm has at least two arm sections that are linked flexibly to each other.

9. The vehicle as claimed in claim 7 further comprising at least one receiver for at least partial receiving of the support arm in the rest position is arranged on a structural component.

10. The vehicle as claimed in claim 7 further comprising a further support arm articulated pivotably laterally on the body or on the first element and a closing unit arranged on the first element or the body, wherein the further support arm is pivotably articulated between a rest position, in which the further support arm is immovably secured to the body or the first element, and a functional position, in which the further support arm pivots in a direction of the closing unit and is capable of being fixed with another end to the closing unit by an actuation of the closing unit.

11. The vehicle as claimed in claim 10 further comprising a mechanism for displacing a point of articulation of the support arm fixed to the locking mechanism and/or of the further support arm fixed to the closing unit.

12. The vehicle as claimed in claim 10 further comprising a mechanism for varying a length of the support arm fixed to the locking mechanism and/or of the further support arm fixed to the closing unit.

13. A motor vehicle comprising:
a body;
a tailgate arranged pivotably on the body, wherein the tailgate in a closed position closes a cargo space opening of the body at the rear and in an open position at least partially exposes the cargo space opening;
a tailgate latch for locking the closed position of the tailgate, wherein the tailgate latch has a closing element and a locking mechanism interacting with the closing element in the closed position of the tailgate, wherein the closing element or the locking mechanism is arranged movably between a first functional position, in which locking of the closed position of the tailgate can take place, and a second functional position, in which the closing element or the locking mechanism is displaced with the tailgate in the open position in a direction of the locking mechanism or of the closing element; and
an adjustment mechanism connecting the closing element or the locking mechanism to a structural component of the motor vehicle, which is adapted to displace the closing element or the locking mechanism in a direction of the first functional position and/or to subject it to a force in the direction of the first functional position, wherein the tailgate has a lower tailgate element connected to the body via at least one articulation element on a lower side of the tailgate and an upper tailgate element connected to the body via at least one articulation element on an upper side of the tailgate, wherein the closing element is arranged on the upper tailgate element or the lower tailgate element and the locking mechanism is arranged on the lower tailgate element or the upper tailgate element or on the body.

14. The motor vehicle as claimed in claim 13 further comprising a support arm articulated pivotably laterally on the body or on the lower tailgate element and a closing unit arranged on the lower tailgate element or the body, wherein the support arm is pivotably articulated between a rest position, in which the support arm is immovably secured to the body or the lower tailgate element, and a functional position, in which the support arm pivots in a direction of the closing unit, and is capable of being fixed to the closing unit with another end by an actuation of the closing unit.

15. The motor vehicle as claimed in claim 13 further comprising a support arm articulated pivotably laterally on the body and pivotably articulated on the lower tailgate element having at least two arm sections that are linked flexibly to each other, wherein the support arm is movably arranged between a retracted rest position, in which the arm sections are arranged adjacent to one another, and an extended functional position, in which the arm sections are arranged in alignment with one another.

16. The motor vehicle as claimed in claim 13 further comprising a telescopic support arm articulated pivotably laterally on the body and on the lower tailgate element, wherein the support arm is adjustable in length between a retracted rest position and an extended functional position, in which the length of the support arm is greater than in the retracted rest position.

17. The motor vehicle as claimed in claim 13 further comprising a lateral cover, with which a free space formed between the cargo space opening and the tailgate in the open position is capable of being covered laterally.

* * * * *